Sept. 10, 1929.                A. ZERBO                 1,727,917
                              BRUSH MOUNTING
                       Filed March 12, 1927        2 Sheets-Sheet 1

INVENTOR
ANGELO ZERBO
BY
ATTORNEY

Sept. 10, 1929.  A. ZERBO  1,727,917
BRUSH MOUNTING
Filed March 12, 1927  2 Sheets-Sheet 2

INVENTOR
ANGELO ZERBO
BY
ATTORNEY.

Patented Sept. 10, 1929.

1,727,917

UNITED STATES PATENT OFFICE.

ANGELO ZERBO, OF DETROIT, MICHIGAN.

BRUSH MOUNTING.

Application filed March 12, 1927. Serial No. 174,722.

This invention relates to brush mountings and the object of the invention is to provide a brush mounting for electric motors or the like in which the entire brush support may be adjusted vertically.

Another object of the invention is to provide a brush mounting in which the tension on the brushes may be adjusted to produce a greater or less pressure.

A further object of the invention is to provide a brush mounting in which the brushes may be readily removed for replacement and in which the pressure devices for the brushes may also be readily removed for replacement of any of the parts.

These objects and the several novel features of the invention are hereinafter more fully described and claimed and the preferred form of construction by which these objects are attained is shown in the accompanying drawings in which—

Figure 1:
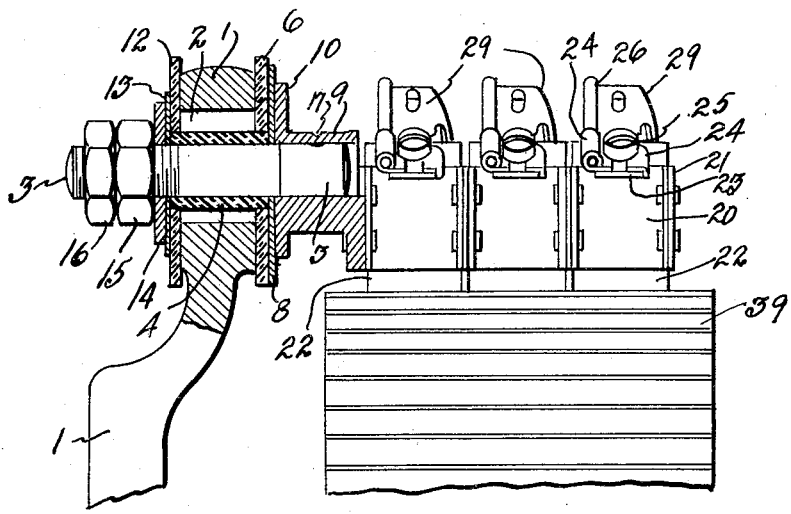
Fig. 1 is an elevation of a brush mounting embodying my invention and showing the supporting member in section.
Figure 2:
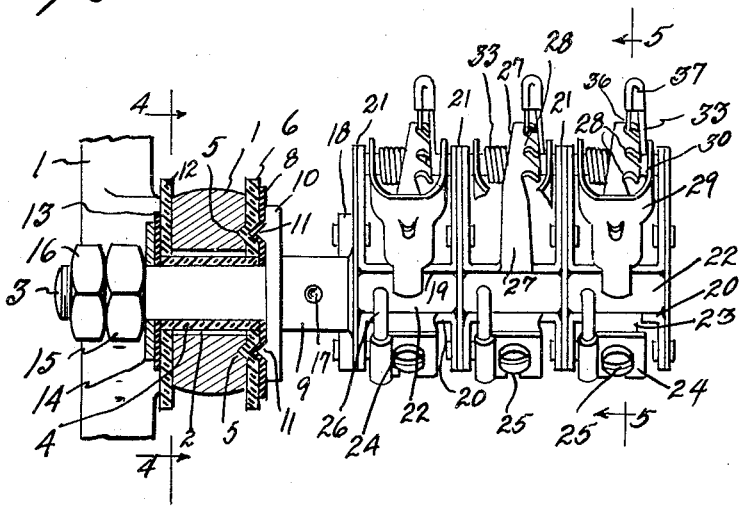
Fig. 2 is a plan view of the brush mounting with the supporting member shown in section.
Figure 4:
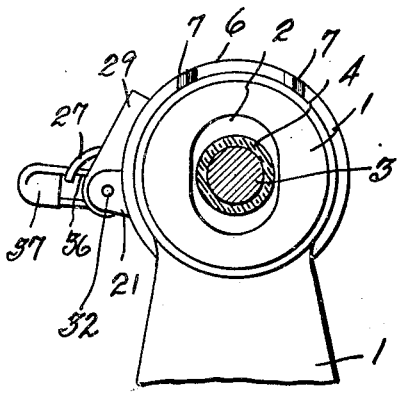
Fig. 4 is a section taken on line 4—4 of Fig. 2.

The device comprises a fixed support 1 having an elongated aperture 2 therein as shown in Figs. 1 and 4. A shaft 3 is provided extending through the aperture 2 and an insulating sleeve 4 is positioned on the portion of the shaft extending through the aperture 2. As shown in Fig. 2 the support 1 is provided with two ways or grooves 5 in the face thereof and an insulating washer 6 is provided having ribs 7 fitting the grooves 5. This washer as shown in Fig. 1 is apertured at the center and fits on the insulator sleeve 4. A second washer 8 is provided with ribs fitting the grooves or ways in the washer 6 and is apertured at the center to fit the shaft 3 as shown in Fig. 1. A member 9 is threaded onto the end of the shaft 3 as shown in Figs. 1 and 2 and is provided with a flange 10 having ribs 11 fitting the grooves in the washer 6. A flat washer 12 fits against the opposite face of the supporting member 1 and is apertured at the center to fit on the insulating sleeve 4. This washer is backed up by a smaller washer 13 which fits about the shaft 3 and a metal washer 14 is provided against which the nut 15 is adapted to engage. This nut 15 is threaded onto the shaft 3 and a lock nut 16 is provided for locking the nut 15 in position. In order to secure the member 9 to the shaft 3 a depression 17 is made in the member 9 which as shown in Fig. 1 depresses a portion of the member 9 into the end of the shaft 3. By means of the ways 5 and the ribs 11 on the flange 10 the member 9 is prevented from turning in relation to the support 1 and by means of the depression 17 the shaft 3 is prevented from turning in the member 9.

Figure 3:
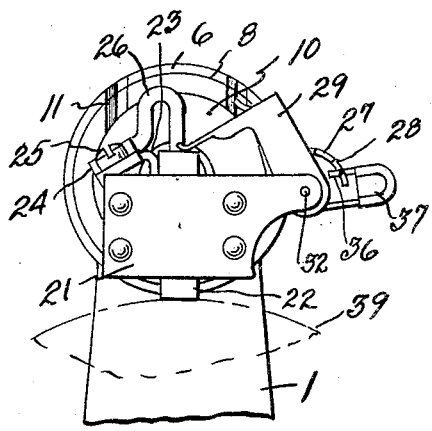
Fig. 3 is an end view of the device.
Figure 5:
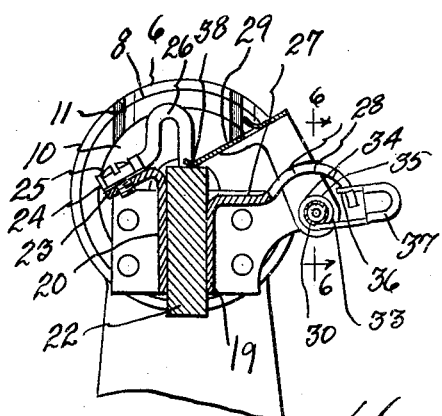
Fig. 5 is a section taken on line 5—5 of Fig. 2.
Figure 6:
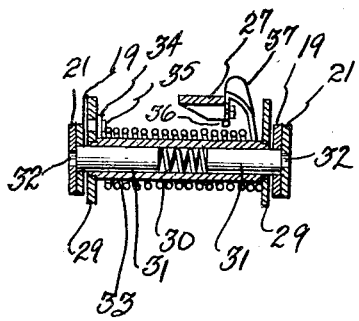
Fig. 6 is a section taken on line 6—6 of Fig. 5.

The brush holders are formed of sheet metal and the member 9 is provided with a flange 18 to which the brush holders are secured. The brush holders comprise a U shaped sheet metal plate 19 and a U shaped sheet metal plate 20 which are secured to the plates 21 to provide a space therebetween in which a carbon brush is slidably mounted. The U shaped plate 20 is provided with a tongue 23 to which a contact member 24 is secured by the screw 25. A flexible cable 26 connects the contact member 24 with the carbon brush 22. The U shaped metal plate 19 is provided with an extending tongue 27 having a series of notches 28 shown in Figs. 2 and 5. Mounted between the ends of the U shaped member 19 is a pressure member 29 as shown in Figs. 2, 3 and 5. As shown in Fig. 6 a sleeve 30 is secured between the ends of the pressure member 29 and this sleeve contains two spring pressed pins 31 which extend into apertures provided therefor in the ends of the member 19. The plates 21 which are secured to opposite sides of the member 19 are each provided with an aperture 32 through which a pointed instrument may be inserted to disengage the respective pin from its aperture and allow removal of the pressure member 29 and its component parts. A coiled spring 33 is positioned about the sleeve 30 and the end 34 thereof engaged behind a lug 35 struck out from the member 29 shown more particularly in Fig. 5 and the opposite end of the spring 33 is provided with a return bent end 36 which is held rigid by the sheet metal covering 37. This end 36 is adapted to be engaged in the notches 28 to vary the tension of the spring 33 as will be understood from Figs. 2, 3, 5 and 6 which tends to turn the pressure member 29. This pressure member 29 is provided with a rounded end 38 which presses on the top of the brush 22 and tends to force it downwardly into contact with the commutator 39 shown in Fig. 1. In Figs. 1 and 2 three of these brush mountings are shown in assembled relation and each mounting is the same and a greater or less number of brush mountings may be used as required.

By loosening the screws 25 the brushes and connections may be readily removed or replaced and by pressing the pins 31 shown in Fig. 6 inwardly the pressure members and pressure springs may be removed. By this arrangement any of the parts may be readily removed or replaced. As the brushes become worn the nuts 15 and 16 may be loosened allowing the entire brush mounting to be moved toward the lower end of the elongated aperture 2 in the fixed support 1 thus allowing considerable adjustment for taking up wear and by engaging the spring ends 36 in the different notches 28 the pressure on the brushes may be adjusted for the best efficiency.

From the foregoing description it becomes evident that the device is very simple and efficient in operation, will not easily get out of order, provides a brush mounting in which the parts may be readily replaced and provides a device which accomplishes the objects described.

Having thus fully described my invention, its utility and mode of operation, what I claim and desire to secure by Letters Patent of the United States is—

1. In a device of the character described, a brush holder, a brush slidably mounted in the holder, a pressure member having a pair of legs, a tube secured between the legs, and opening through the legs at each end, a pair of pivot pins slidably mounted in the tube, a coiled spring positioned in the tube between the pivot pins, the holder being provided with recesses into which the pins are pressed by said spring to provide a pivot for the pressure member, the pressure member having an end engaging the said brush, a tongue extending from the brush holder between the legs of the pressure member and having a series of notches therein, a spring having one end engaging the pressure member to apply pressure thereto, the opposite end of the spring being adapted for engagement in the notches of the tongue to vary the pressure.

2. In a device of the character described, a brush holder, a brush slidably mounted in the holder, a pressure member having a pair of legs pivotally mounted in the holder at one side of the brush and having an end engaging the said brush, a tongue formed integrally with the holder and extending between the legs of the pressure member, the tongue having a series of notches therein, and a spring having one end engaging the pressure member to apply pressure thereto, the opposite end of the spring being return bent, a clip holding the end of the spring in the return bent position, the said return bent end being adapted for engagement in the notches of the tongue to vary the tension of the spring.

3. In a device of the character described, a brush holder, a brush slidably mounted in the holder, a pressure member having a pair of legs pivotally mounted in the holder at one side of the brush and having an end engaging the said brush, a tongue extending from the holder between the legs of the pressure member and having a series of notches therein, a spring having one end engaging the pressure member to apply pressure thereto, the opposite end of the spring being adapted for engagement in the notches of the tongue to vary the pressure.

In testimony whereof I sign this specification.

ANGELO ZERBO.